United States Patent [19]

Hackett et al.

[11] Patent Number: 5,926,210
[45] Date of Patent: Jul. 20, 1999

[54] MOBILE, GROUND-BASED PLATFORM SECURITY SYSTEM WHICH TRANSMITS IMAGES THAT WERE TAKEN PRIOR TO THE GENERATION OF AN INPUT SIGNAL

[75] Inventors: Kenneth R. Hackett; Kenneth G. Van Horn, both of Boulder; William H. Wikman, Jr., Westminster, all of Colo.

[73] Assignee: Kalatel, Inc., Corvallis, Oreg.

[21] Appl. No.: 09/050,438

[22] Filed: Mar. 30, 1998

Related U.S. Application Data

[63] Continuation of application No. 08/641,489, May 1, 1996, abandoned, which is a continuation-in-part of application No. 08/508,918, Jul. 28, 1995, abandoned.

[51] Int. Cl.$^6$ ...................................................... H04N 7/18
[52] U.S. Cl. .......................... 348/158; 348/150; 348/151; 348/152
[58] Field of Search ................................... 348/143, 144, 348/148, 158, 159, 211, 212–214, 376; 386/46; 340/52; 364/401; 379/58, 64

[56] References Cited

U.S. PATENT DOCUMENTS

| | | | |
|---|---|---|---|
| 3,349,679 | 10/1967 | Lohman, III | 95/11 |
| 3,535,442 | 10/1970 | Jennings | 178/6.8 |

(List continued on next page.)

OTHER PUBLICATIONS

Cruz et al., "Capturing and Playing Multimedia Events with Streams," Proceedings ACM Multimedia, Oct. 1994, pp. 193–200.

W. Stallings, Ph.D., Data and Computer Communications, 1985, pp. 130–139.

TVX, Inc. Brochure entitled, "Imagine . . . if 9 times out of 10 there was nobody on the phone when it rang . . . Now you know how the police feel about false alarms."

TVX, Inc. Brochure entitled, "How Can A Device This Small Make Such A Huge Contributon To Your Security System?".

TVX, Inc. Brochure entitled, "Now . . . Double Your Outdoor Perimeter Security . . . and Eliminate 'False Alarms' With TVS IPS–1000, The Only Computer Intelligent Buried Cable Perimeter Protection System, Combined With The Instant Visual Alarm Observation System."

TVX, Inc. Brochure entitled, "TVX IPS–1000—The Intelligent Perimeter Protection System—Affordable And Eliminates False Alarms!".

TVX, Inc. Brochure entitled, We 'Shoot' The Robber As The Hold–up Occurs! TVX Captures The Event And The Criminal!.

(List continued on next page.)

*Primary Examiner*—Dang Ton
*Assistant Examiner*—David R Vincent
*Attorney, Agent, or Firm*—Holme Roberts & Owen LLP

[57] ABSTRACT

The present invention discloses a security system for monitoring a mobile, ground-based platform via image acquisition in the form of electrical pixel signals. In one embodiment, the system includes a plurality of cameras attached to the platform and arranged to capture images of zones associated with the interior of the platform or with its exterior and current ambient environmental surroundings. Storage media is located on the platform for storing images captured in the form of electrical signals by the cameras. The system is configured for transferring images to the storage media and to at least one remote location wherein the images are viewable at the remote location. The system may advantageously employ wireless transmission to transfer images to a remote location. The images may be captured responsive to an input such as from a panic button. The system may also employ removable storage media for storing images on the platform. Upon removal, the removable storage media may be transported to the remote location. The images stored in the removable storage media may then be randomly accessed and viewed at the remote location.

18 Claims, 4 Drawing Sheets

U.S. PATENT DOCUMENTS

| | | | |
|---|---|---|---|
| 4,112,818 | 9/1978 | Garehime, Jr. | 89/41 |
| 4,122,818 | 10/1978 | Garehime, Jr. | 89/41 |
| 4,414,576 | 11/1983 | Randmae | 358/229 |
| 4,638,289 | 1/1987 | Zottnik | 340/52 H |
| 4,816,828 | 3/1989 | Feher | 340/945 |
| 4,831,438 | 5/1989 | Bellman, Jr. et al. | 358/108 |
| 4,857,912 | 8/1989 | Everett, Jr. et al. | 340/825.3 |
| 4,876,597 | 10/1989 | Roy et al. | 358/141 |
| 4,949,186 | 8/1990 | Peterson | 358/335 |
| 4,984,089 | 1/1991 | Stiepel et al. | 358/229 |
| 4,994,971 | 2/1991 | Poelstra | 364/424.04 |
| 5,012,335 | 4/1991 | Cohodar | 358/108 |
| 5,062,133 | 10/1991 | Melrose | 379/94 |
| 5,144,661 | 9/1992 | Shamosh et al. | 380/9 |
| 5,168,444 | 12/1992 | Cukor et al. | 364/401 |
| 5,237,408 | 8/1993 | Blum et al. | 358/108 |
| 5,389,965 | 2/1995 | Kuzma | 348/14 |
| 5,432,871 | 7/1995 | Novik | 382/232 |
| 5,497,419 | 3/1996 | Hill | 380/9 |
| 5,576,757 | 11/1996 | Roberts et al. | 348/207 |
| 5,646,994 | 7/1997 | Hill | 380/9 |
| 5,751,345 | 5/1998 | Dozier et al. | 348/153 |
| 5,751,346 | 5/1998 | Dozier et al. | 348/153 |

OTHER PUBLICATIONS

TVX, Inc. Brochure entitled, "The TVX Camera–On–A–Chip System Inexpensively Transmits 4 Pictures Of What Caused The Alarm To A Monitoring Station In Less Than 20 Seconds!".

Stallings, Data and Computer Communications, pp.: 130–139, 1985.

Stallings, Data and Computer Communications, pp.: 1–13 (renumbered by examiner), 1988.

RGB Watchdog 250, 1993.

MOBILE, GROUND-BASED PLATFORM SECURITY SYSTEM WHICH TRANSMITS IMAGES THAT WERE TAKEN PRIOR TO THE GENERATION OF AN INPUT SIGNAL

CROSS-REFERENCE TO RELATED APPLICATION

The present application is a continuation of U.S. patent application Ser. No. 08/641,489 for "MOBILE, GROUND-BASED PLATFORM SECURITY SYSTEM" filed May 1, 1996, now abandoned, which is a continuation-in-part of U.S. patent application Ser. No. 08/508,918 for "IMPROVED SITE SECURITY SYSTEM" filed Jul. 28, 1995, now abandoned, incorporated herein by this reference in its entirety.

FIELD OF THE INVENTION

This invention relates generally to the field of security systems for mobile platforms and, more particularly, to systems for capturing optical images on the mobile platform and within its ambient environment at predetermined intervals and/or in response to alarm or other input signals.

BACKGROUND OF THE INVENTION

Security systems are widely used for monitoring fixed-sites such as, for example, buildings, commercial establishments or outdoor areas. These systems are configured in different ways, dependent upon the intended application, to fulfill the need for providing alarm indications. For example, one alarm indication may be provided as an audio signal emitted by a siren at the site. The alarm indication may be responsive to a motion detector, a smoke detector or other similar such detectors which are well known in the art. Another alarm indication may be provided to a central monitoring location via standard or dedicated telephone lines. From the central monitoring location, the proper authorities can be notified to respond to an immediate security threat at a particular site. This latter indication may be used in combination with the former, if so desired.

Some past fixed-site systems, as described above, also employ one or more video cameras to send an analog video signal to the monitoring station. In this way, personnel at the remote monitoring location can view the post-alarm state of the site whereby to determine if a response is warranted. Hence, response to false alarms by the authorities can be minimized. While these prior art fixed-site monitoring systems are generally effective, it should be appreciated that the adaptability of these systems for use in monitoring mobile, ground-based platforms is limited, as will be described below.

Unlike past fixed-site monitoring security systems, systems for use in mobile, ground-based platform monitoring applications have relied to a large extent on alarm signals emitted directly into the ambient environment of the platform in the hope that someone may respond or that the alarm signal itself will provide a deterrence. For example, automobile alarm systems, in most cases, provide an audio signal from a siren which may be accompanied by other signals such as, for example, flashing headlights. Unfortunately, response to these signals is far from assured. It should also be appreciated that mobile, ground-based platforms operate under a multitude of different conditions in a constantly changing ambient environment and that, in some cases, the emission of an audio alarm signal into the ambient environment of the platform may actually be inappropriate or inadequate. Moreover, the operational environment of the platform may dictate the need for forms of monitoring other than just system response to alarm events.

As an example, a public transportation bus is subject to emergency situations including terrorism, hijacking and accidents. In the aforementioned and other situations, the particular capability of fixed-site monitoring, in which a remote monitoring station is immediately notified of a problem, is most appropriate. Unfortunately, this capability is not provided in most mobile, ground-based systems of the past. Unlike fixed-site systems, a security system on a mobile platform, such as the bus of the present example, is not able to rely on fixed telephone lines for the communication of an alarm indication or any form of post-alarm image to a monitoring location.

Moreover, involvement of the bus in an accident with a pedestrian, another vehicle or with a stationary object is of intense concern for any number of reasons to public safety officials, the transportation utility which operates the bus and any insurance companies representing the respective entities. Public safety officials are interested in reducing emergency personnel response time and in arriving at the scene of an accident in possession of tools which may be needed for the particular situation. Further, the transportation utility operating the bus would like to know what caused the accident and who was at fault for use in formulating policies which will prevent the future occurrence of a similar accident. Insurance companies are, of course, interested in information establishing responsibility for the accident. Additionally, the utility's insurance company and the utility itself are interested in historical information determinate of who actually was on the bus and in what specific way they were injured. Such information is useful for purposes of reducing liability by limiting fraudulent claims. While prior art systems configured for monitoring mobile, ground-based platforms have attempted to address some of these needs, as described above, there has not yet been a sweeping approach which adequately resolves the various concerns. It should also be appreciated that only a few aspects of monitoring a particular type of mobile, ground-based platform have been described for exemplary purposes.

One proposed prior art system utilizes a video tape recording system on a school bus in an attempt to improve the behavior of the student passengers. The system provides a camera positioned above the driver for providing an analog video signal to a video tape recorder. A video history of the events occurring within the passenger compartment of the school bus is recorded on the tape. Such a system, within the context of the example of the public transportation bus above, may help to deter vandalism and, obviously, would provide a record of who was on the bus. However, the system is subject to the limitations imposed by an analog video tape system. For example, storage on a video tape is limited. The tape must, therefore, be changed frequently. Additionally, video tape does not provide for random access to a specific image contained thereon. Locating a particular recorded event requires an arduous review of the contents of the tape using the valuable time of security personnel. Aside from the limitations imposed just by the video tape itself, the system makes no provision for alarm indications which address the other situations described above.

SUMMARY OF THE INVENTION

Accordingly, the present invention comprises features directed to the following objectives:

To provide a security system for a mobile, ground-based platform that transfers images from the mobile, ground-based platform to at least one remote location wherein the images are viewable at the remote location.

To provide a security system for a mobile, ground-based platform that captures images at the platform and, thereafter, stores the images in a way which provides random access to the images from a remote location.

To provide a security system for a mobile, ground-based platform that provides for wireless transmission of one or more preselected images stored at the platform to a remote location for viewing.

To provide a security system for a mobile, ground-based platform that stores images at the platform and which responds to at least one input signal by capturing and storing at least one alarm image and then transmits preselected ones of the images stored at the platform including the alarm image to a remote location using wireless transmission.

To provide a security system for a mobile, ground-based platform that responds to at least one input signal for a predetermined period of time after the platform is stationary.

To provide a security system for a mobile, ground-based platform that receives a signal from a remote location and, responsive to the signal, captures alarm images of the platform and/or its ambient environmental surroundings and, thereafter, transmits the alarm images back to the remote location using wireless transmission.

To provide a security system for a mobile, ground-based platform that stores captured images on removable media at the platform such that the removable media can be removed from the platform, transported to the remote location and the images contained by the removable media may then be viewed by random access at the remote location.

One or more of the above objectives are addressed by a mobile, ground-based security system that generally includes at least one imaging means attached to the platform for capturing images as electrical pixel signals, storage means for storing images captured by the camera, and means for transferring the images to at least one remote location for review. Preferably, a plurality of imaging means cameras are arranged to provide images of zones associated with the interior of the platform or with its exterior and current ambient environmental surroundings. Each camera converts optical images to electrical pixel, or digital, image signals and temporarily stores one or more images. The temporarily stored images are then transferred to the remote location in one or more predetermined ways. As will become appreciated, the capture and storage of images in the form of electrical pixel data allows significant advantages in varied aspects of the present invention.

In one aspect of the invention, the storage media may comprise a hard drive which stores digital image data in a non-volatile manner. Such storage accommodates random access to images as well as data transfer.

In another aspect of the invention, the image transfer means may transfer images to a remote location using wireless transmission. Such transmission accommodates real-time response to alarm signals. In one embodiment, images are transferred with a cellular telephone transceiver using a transmission scheme which verifies accurate receipt of the images at the remote location and automatically provides for retransmission/completion of data transfer in the event of an interruption (e.g., due to tunnel interference).

In a further aspect of the invention, the image transfer means includes removable storage media which may be physically removed from the mobile, ground-based platform and transported to a remote location. The images may then be viewed at the remote location in a random access manner.

As can be appreciated, viewing transferred images using a random access format allows an operator to perform searches based on parameters which are stored along with each image. Such parameters include, but are not limited to, identification of the camera which captured the image, identification of the specific mobile platform from which the image was transferred, the date of capture and the time of capture.

In another aspect of the invention, images are captured responsive to one or more inputs and/or at predetermined intervals. Image capture may be triggered by inputs such as a panic button and an impact sensor. In response to these inputs, the system immediately captures alarm images and transfers these images to a remote location preferably using wireless transmission. The system may also operate in an interval image record mode wherein images are captured and stored at predetermined intervals on storage media. The system is configurable so as to bundle interval images with alarm-driven images so as to provide pre- and post- alarm views of the platform at a remote location following wireless transmission of the images thereto. The interval images may be stored along with alarm images on removable storage media.

In a further aspect of the present invention, the system may be operated in a maintenance mode. One feature of the maintenance mode permits removal of removable storage media from the mobile platform. Another feature of the maintenance mode allows a notebook PC or other computer to be connected directly to the system at the mobile platform. The notebook PC then may access any images stored at the platform. It should be appreciated that the notebook PC is particularly useful in embodiments which do not include removable storage media or in embodiments wherein images may not be stored on the removable media but are available on other permanent media.

In another aspect of the present invention, each imaging means digitizes and compresses the electrical pixel signals for an image before the image is transferred. Once the images are transferred to the remote location they are subsequently decompressed for display to an operator. In this manner, the number of electrical pixel signals for an image(s) is decreased and the corresponding time to transfer the image(s) is thereby decreased.

In this regard, each imaging means may further provide image data that includes compression identification information. The monitoring station decompresses the image data responsive to the compression identification information. In one embodiment, the monitoring station includes a plurality of decompression algorithms with one of the decompression algorithms being selected for use in decompressing the image data by the associated compression identification information. In another embodiment, the compression identification information includes information that is used by the decompression algorithm to decompress the corresponding image data. For example, for systems having variable image resolutions, the compression identification information can include a compression table that is generated by a camera for image data having a selected image resolution. The compression table is transmitted along with the associated image data to the remote location for use in a decompression algorithm during decompression of the image data.

In another aspect of the present invention, each imaging means provides a variable image resolution that is selectable. Selectable image resolution is provided by a camera selecting for transmission a subset of the locally stored image data for each image. Transmission of the highest image resolution corresponds to transmission of all image data while lower resolution images correspond to transmission of less than all of the image data (e.g., every second pixel).

BRIEF DESCRIPTION OF THE DRAWINGS

For a more complete understanding of the present invention and further advantages thereof, reference is now made to the following Detailed Description, taken in conjunction with the Drawings, in which.

DETAILED DESCRIPTION OF THE INVENTION

Figure 1:
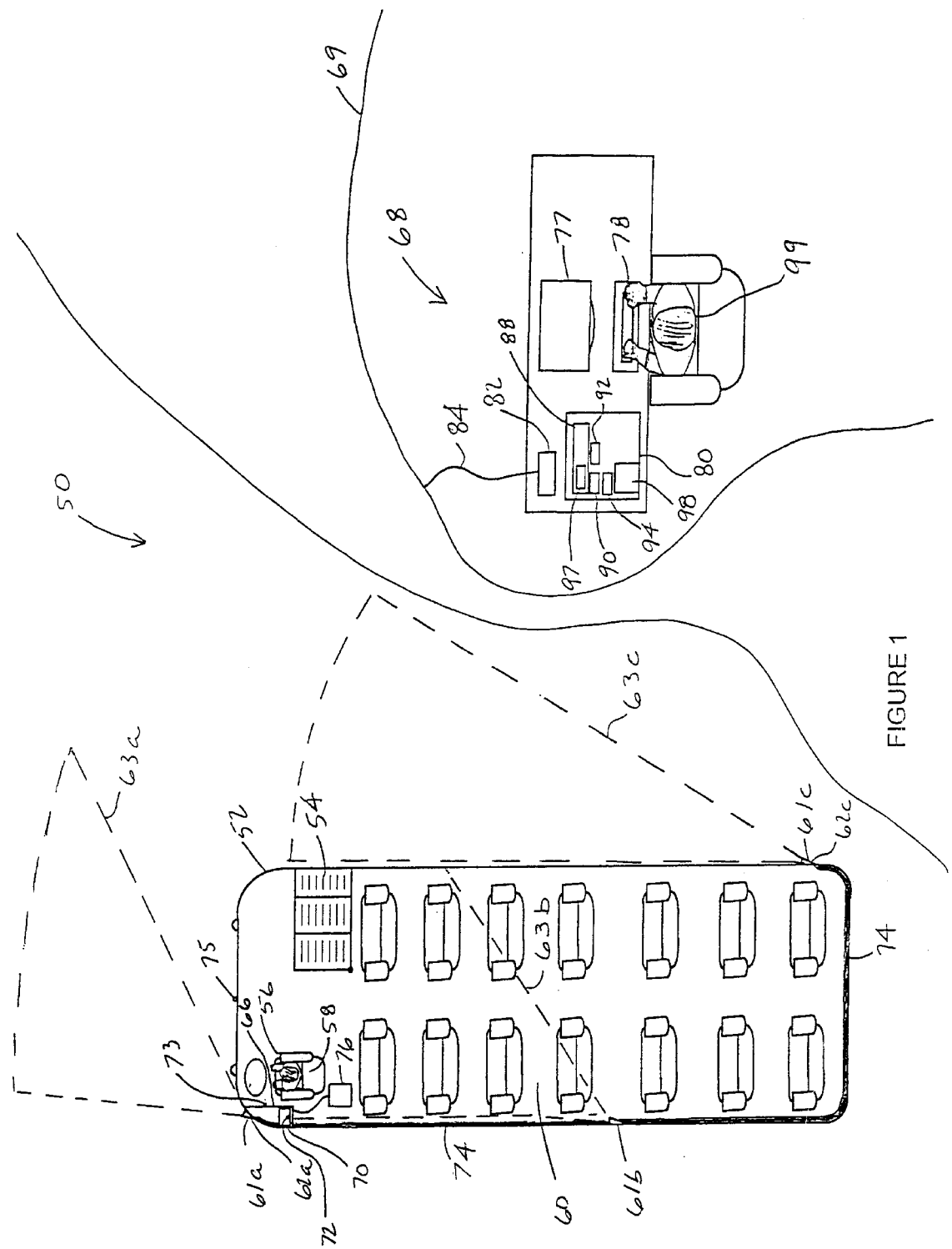
FIG. 1 is an explanatory diagram illustrating a security system for use in capturing optical images in areas associated with a mobile platform, such as a public transportation bus, and for transferring the images to a remote location in one of several different ways.

Attention is immediately directed to FIG. 1 which illustrates a diagrammatic plan view of a security system, generally indicated by reference numeral 50, constructed in accordance with the present invention. System 50 monitors a mobile platform in the form of a public transportation bus 52. Bus 52 includes a passenger entrance stairway 54, an operator station 56 for an operator 58 and a passenger seating area 60. It is to be understood that bus 52 is shown for illustrative purposes only and that the present invention may be configured for use in monitoring a wide variety of mobile platforms such as, for example, armored cars, transport trailers, cargo containers and private passenger vehicles.

Continuing with a description of FIG. 1, system 50 includes three electronic cameras 61a, 61b and 61c positioned within respective housings 62a, 62b and 62c which are attached to the bus at predetermined locations so as to capture images of zones 63a, 63b and 63c (generally indicated by dashed lines) adjacent respective cameras. It is mentioned that the physical size of cameras 61 and their associated housings have been exaggerated for illustrative purposes. While only three zones are illustrated herein for purposes of simplicity, the system may be configured to monitor any number of zones associated with either the interior of a mobile platform and/or its exterior and current ambient environmental surroundings.

System 50 further includes a component enclosure 66, which is installed at a suitable location within the bus and a remote monitoring station 68 at a remote location 69. For purposes of clarity, component enclosure 66 is shown positioned directly adjacent operator station 56, however, a number of factors should be considered in determining an appropriate location for the component enclosure. For example, even in cases where the component enclosure is designed to be tamper resistant, access to the enclosure by unauthorized persons should be limited whenever possible. To that end, enclosure 66 includes a door 70 with a lock 72 whereby to permit controlled access to the interior of enclosure 66 by authorized personnel only. Enclosure 66 also supports a panic alarm button 73, which is positioned near floor level for actuation by the foot of bus operator 58 and is hidden from the view of passengers. A network of data cables 74 interconnects cameras 61 with component enclosure 66. The sizes of enclosure 66 and of cables 74 have been exaggerated for illustrative purposes. Moreover, these cables, as with all components located on the bus, should be arranged within the bus in a way which avoids unauthorized access thereto. Cable network 74 will be described in further detail at an appropriate point hereinafter. A cellular transceiver antenna 75 is positioned at a hidden, inaccessible location, preferably on the roof of the bus. In the present example, antenna 75 is shown positioned on the front exterior of the bus. Furthermore, the antenna may be housed in a concealing, protective cover (not shown) which is transparent to cellular telephone transmissions. A notebook computer 76 which may be a standard portable PC is selectively interfaceable with system 50 via a cable by maintenance personnel. Notebook computer 76 is not normally on board bus 52 and is typically used only in maintenance situations when the bus is out of service, as will be described below.

Still referring to FIG. 1, remote monitoring station 68 includes a display monitor 77, a keyboard 78, a computer 80 and a modem 82 connected with a standard telephone line 84. Computer 80 may be a standard personal computer and includes a mass memory 88, I/O circuitry 90, a CPU 92, and a memory 94. An image transfer/verification program 97, which is designed in accordance with the present invention, is stored in mass memory 88. A removable hard drive bay 98 is accessible from the front of computer 80 and is configured to receive an appropriately configured removable hard drive. The components which make up computer 80 are interconnected in a standard way, as is well known in the art, using data busses which are not shown for purposes of simplicity. A monitoring station operator 99 is seated at monitoring station 68. The operation of image transfer/verification program 97 will be described later in conjunction with a general discussion of the overall operational features of the present invention. It is to be understood that the configuration of remote monitoring station 68 can be modified in an unlimited number of ways within the scope of the invention and that this specific configuration is shown for illustrative purposes only.

Figure 2:
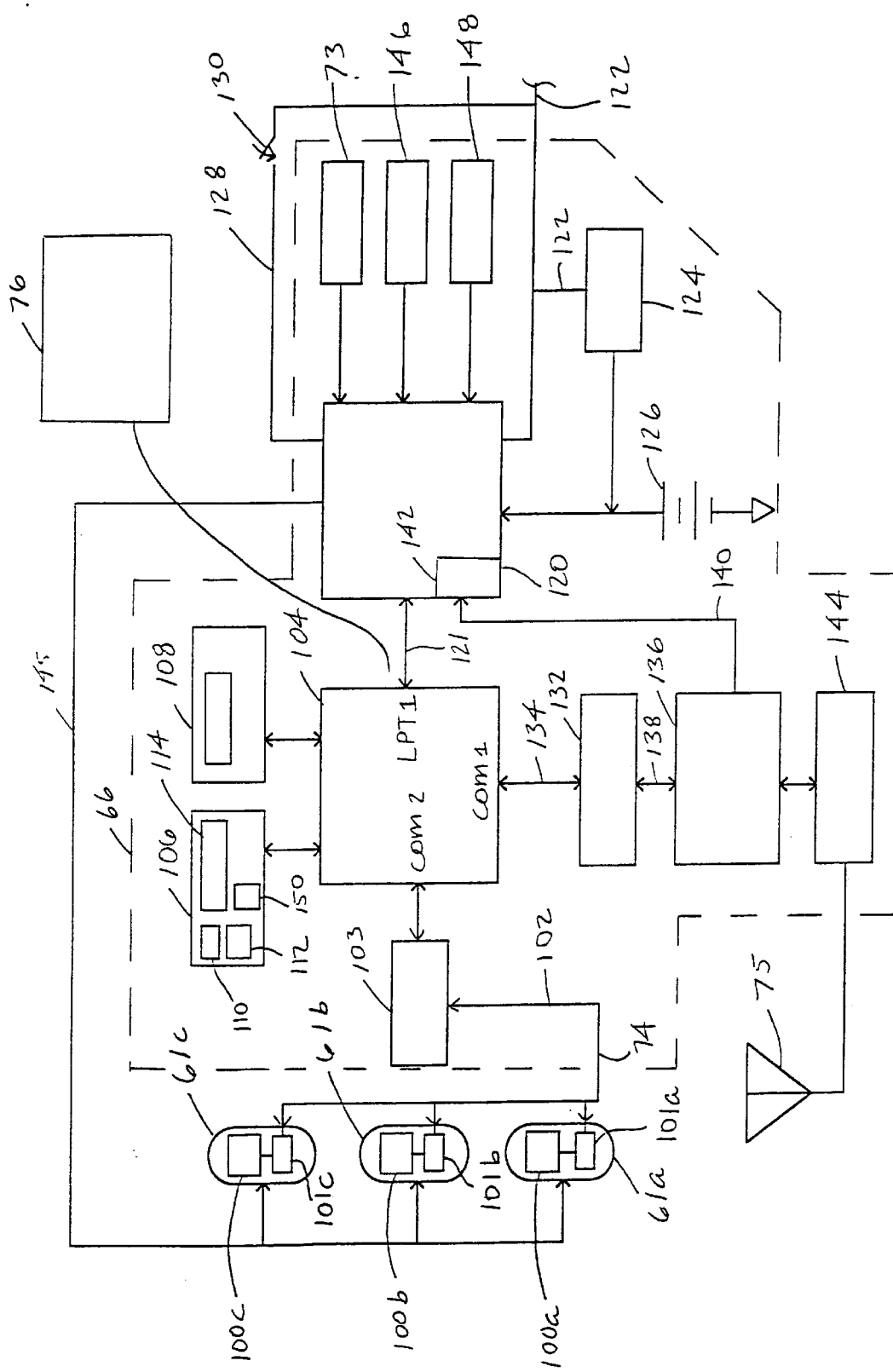
FIG. 2 is a block diagram illustrating the components which make up the system at the mobile platform and at the remote monitoring station.

Having generally described the components which make up system 50 of the present invention, attention is now directed to FIG. 2 in conjunction with FIG. 1. FIG. 2 illustrates, in diagrammatic block diagram form, the internal components of enclosure 66 and the interconnections formed between the components which are located on bus 52. Cameras 61, in the present example, are configured for use with RS-485 data lines. Each camera 61 includes a corresponding image capture section 100a, b and c and a corresponding image processing/temporary storage section 101a, b and c. It should be appreciated that cameras 61 may be configured and interfaced with the system in a variety of ways in accordance with the present invention. In the present example, each image capture section 100a, b and c comprises a CMOS image detection integrated circuit (e.g., defining a 320 by 240 pixel array); and each image processing storage section 101a, b and c includes an analog to digital convertor and memory, as further described in U.S. patent application Ser. No. 08/508,918, incorporated hereinabove by reference. The image processing/temporary storage section 101 for each camera may be located at other points within the system with no discernible influence on the operation of the overall system. The cameras are connected via image processing/temporary storage sections 101 to an RS-485 data line 102 forming part of cable network 74. Images are digitally captured by the cameras in the form of electrical pixel signals. It should be appreciated that this format provides for a wide variety of known image processing options. RS-485 data line 102 is, in turn, connected with a bi-directional RS-485 to RS-232 converter 103. Converter 103 converts the standard full duplex RS-232 COM2 interface of a personal computer 104 to a half duplex RS-485 interface in order to enable bi-directional communication with the cameras. Typically, each camera is assigned a unique address within a predetermined range of possible addresses. The camera address may be set by, for example, a set of DIP switches located in each camera. Any communications transmitted through the RS-485/RS-232 interface to or from a respective camera will contain that camera's unique address.

The cameras provide for a variable image resolution that is selectable by software commands from personal computer 104. Image processor/temporary storage section 101 selects and transmits a subset of the array of image data for each image to provide the selected image resolution. For example, the image processor transmits a high, medium or low resolution image by selecting 320 by 240 pixels (all of the pixels), 156 by 100 or 80 by 48 of the array of image data, respectively.

The image processing portion of section 101 compresses the image data before it is transmitted to personal computer 104. The compressed image data is subsequently decompressed at the remote monitoring station for viewing. One or more data compression/decompression algorithms can be included in the image processing portion and in computer 80 at remote monitoring station 68. The compression algorithm used by the image processing portion of section 101 is selectable by a command from personal computer 104. The image processing portion transmits compression identification information with the compressed image data that selects the decompression algorithm used by computer 80 at remote monitoring station 68 to decompress the image.

The compression/decompression algorithm can include a differential pulse-code modulation (DPCM) standard algorithm. For DPCM compression, the image processing portion transmits substantially all of the image data in the first image transmitted and, thereafter, transmits only the image data that changes in subsequent images. Alternatively, the compression/decompression algorithm can be a discrete cosine transformation (DCT) compression algorithm with run length encoding (RLE) data reduction or a Huffman algorithm such as used in the Joint Photographic Experts Group (JPEG) standard. However, according to the present invention, the data compression/decompression algorithms are adapted to support the variable image resolutions as provided by the image processing portion of sections 101. In one such adaptation, the image processing portion transmits compression identification information that includes information developed by the compression algorithm for image data having a selected image resolution. The compression identification information is used by the decompression algorithm in computer 80 to decompress the transmitted image data.

Continuing to refer to FIGS. 1 and 2, a main hard drive 106 and a removable hard drive 108 are interfaced with personal computer 104. Removable hard drive 108 is positioned within enclosure 66 (FIG. 1) so as to facilitate its removal through door 70. Main hard drive 106 stores a basic operating system 110, a software control program 112 for controlling the overall operation of system 50 and a group of images 114 initially captured by cameras 61 and, thereafter, transferred to main hard drive 106 in a way which will be described at an appropriate point hereinafter. Images in group 114 are stored including the time and date of capture along with identification of bus 52 and the particular camera which captured the image. Specific details regarding the configuration of software control program 112 will also be described below in conjunction with an overall discussion of system operation. Initially, however, system operations will be described in general terms to facilitate a basic understanding by the reader.

Image group 114, stored in main hard drive 106, is selectively transferable to removable hard drive 108 via personal computer 104 upon receipt of a control signal from interface module 120 via LPT1, whereby to make-up a group of transferred image data 116 on the removable hard drive. It should be appreciated that the total number of images storable by each of the main and removable hard drives is determined by a number of factors such as, for example, the number of pixels stored per image and the physical storage size in megabytes of the respective drives. As an example, a 120 megabyte hard drive is capable of storing approximately 8000 images. The significance of these figures will become apparent in the discussion below covering the operation of the system. Various sizes of hard drives may be utilized in implementing the system based upon specific operational parameters, as determined for a particular system. Generally, main hard drive 106 is capable of storing more images than removable hard drive 108. Therefore, when each of the drives has been filled to capacity with images, the main hard drive will typically contain images which are not present on the removable hard drive. Access to images recorded in either of the main or removable hard drives may be had by utilizing notebook PC 76 in a maintenance mode, as will be described hereinafter.

An interface module 120 handles inputs and provides outputs for controlling the system. Interface module 120 is connected to printer port LPT1 of personal computer 104 by a data cable 121 which is configured for selective removal from personal computer 104 whereby port LPT1 is made available for alternative connection with notebook PC 76. A first power supply line 122 provides an unswitched +24 volts DC from the electrical system of the bus to the interface module. The unswitched +24 volts is also used to power a power supply 124 which charges a 12 volt battery 126 and also provides +12 volts DC to the interface module itself. Preferably, operational power for the system is derived from power supply 124. Battery 126 provides backup power for system 50 in the event of failure of the electrical system of bus 52. Interface module 120 also receives switched +24 volts DC via a second power supply line 128. The presence of +24 volts on the switched +24 volt line provides an indication to the interface module that the bus is in an operational mode and, therefore, system 50 should be actively monitoring the bus. Switched +24 volts may be provided via a switch (not shown) dedicated to that purpose and which must be actuated by the operator of the bus or, preferably, by an overall ignition switch 130 which is used to start the bus and which remains closed during operation of the bus.

Still referring to FIGS. 1 and 2, a modem 132 is interfaced with serial port COM1 of personal computer 104 via an RS-232 data line 134. A modem interface 136 is connected to modem 132 via a telephone type line 138. Modem interface 136 provides the modem with 48 volts dc and with a dial tone signal in a manner which is well known in the art. A ring detector signal line 140 couples the modem interface with a ring detector 142 which forms part of interface module 120. A cellular telephone transceiver 144 is connected with modem interface 136 and is, in turn, coupled to previously described cellular antenna 75. Ring detector 142 is configured to respond to the ring generated by transceiver 144 as coupled to the ring detector by the modem interface. Thereafter, the ring detector outputs a signal to personal computer 104 indicating that a ring has been detected. Personal computer 104 responds by placing a force alarm images signal on an image trigger line 145 via interface module 104 to cameras 61. The force alarm images signal also comprises a hardware interrupt which is immediately serviced by the system in a predetermined way, as will be described, while the cameras cease any current tasks and immediately begin capturing alarm images. It should be appreciated that the system is configured to respond rapidly to the force alarm signal so that alarm images responsive thereto are captured as soon as possible following the occurrence of the alarm. Additionally, while the term "alarm images" is used with reference to images forced via this hardware interrupt mechanism, this term is intended to encompass any images that are selectively captured responsive to inputs produced by, for example, sensors, switches, ring detector 142 or by an unlimited variety of other inputs providable by one of ordinary skill in the art. Thus, the system is adaptable to virtually any mobile, ground-based platform application. Other inputs utilized in the embodiment of the present example will be described immediately below.

A force alarm images signal is produced responsive to the previously described panic button 73 which is, like the other inputs, coupled to the interface module. Still another force alarm images signal is produced responsive to an impact sensor 146. Impact sensor 146 is of the type which is well known in the art and provides a signal should the bus be involved in, for example, a collision with another vehicle or with a stationary object such as a telephone pole, either of which produces predetermined levels of deceleration. An input is also provided by a maintenance button 148. Actuation of maintenance button 148 does not cause the system to capture alarm images, but, rather, causes the system to enter the previously mentioned maintenance mode. Both the maintenance button and the impact sensor may be positioned within component enclosure 66 or at other suitable locations on the bus. However, it may be desirable to shock mount component enclosure 66 so as to isolate components therein from jarring during movement of the bus. In such a case, impact sensor 146 should not be located within the component enclosure, but rather mounted to the frame or other such structural member of the bus whereby to be exposed to impacts sustained by the bus. The system of the present invention may be used in conjunction with existing systems which themselves produce input signals. For example, one known system employs a panic button which is actuated by a vehicle operator. Responsive to actuation, this prior art system transmits an alarm signal to a remote location including the coordinates of the vehicle as determined using an onboard GPS receiver. As will be appreciated by one having ordinary skill in the art, the system of the present invention may readily employ such an existing panic button.

Once alarm images are captured responsive to a particular input signal, these images are transferred to main hard drive 106 and then automatically transmitted by the system in a highly advantageous way to remote monitoring station 68 using cellular transceiver 144. At the remote station, the transmitted alarm images are then made available for viewing. The features of the present invention described thus far in combination provide a versatile, highly effective monitoring system. Still further advantages will become apparent in conjunction with a discussion of specific operational details.

System 50 normally operates in an interval image record mode in the absence of inputs such as those described above. It is noted, however, that the occurrence of any of these inputs will interrupt the interval image record mode and, thereafter, service the interrupt by capturing and transmitting alarm images to the remote location or by entering the maintenance mode. During the interval image record mode, software control program 112 periodically produces software commands selectively addressing and instructing each camera 61 to capture images in digital electrical pixel signal form. All of the cameras may be instructed to capture one or more images or, in a particular application, only certain cameras may be instructed to capture one or more images, as specified by software commands. Henceforth, images captured in the interval image record mode will generally be referred to as interval images for purposes of clarity. The interval images are stored within temporary storage sections 101 at each respective camera. Interval images are downloaded from the temporary storage sections through RS-485 bus 102 and converter 103 to personal computer 104. The latter then stores the images in digital form in image group 114 on main hard drive 106 including with each image the time of storage, date and identification of the camera which captured the interval image. The specific interval at which interval images are captured and the number of images captured per camera are both presetable. For example, the interval may range from 2 minutes to 10 minutes and the number of captured images per camera may be set from 0 to 5, as desired. It should be noted that setting a camera to capture no images effectively disables that camera. As previously described, main hard drive 106 will be capable of storing a predetermined number of captured images. In the event that the main hard drive becomes full, new images are written over the oldest images which are present. During interval image record mode, ignition switch 130 is closed thereby presenting switched +24 VDC to interface module 120 on power supply line 122. If, however, the bus is turned off by opening ignition switch 130, voltage will not be present on line 122. This situation can occur if, for example, the bus operator takes a break (mandated in some cities for pollution concerns) or at the end of an operational day. System 50 is configured to respond in this situation, as described above, by transferring images 114, which may include both alarm and interval images, from main hard drive 106 to removable hard drive 108 whereby to comprise transferred image group 116. This configuration is advantageous in that images are transferred to the removable hard drive when the bus is stationary. If images are transferred while the bus is moving and the system is being jarred about, there is an inherent risk in losing image data or in damaging one of the drives. The removable hard drive may be allowed to remain on the bus for a period of time, continuing to accumulate interval and alarm images from day to day until such time that it has nearly reached its storage capacity. At this point, the removable hard drive should be removed.

After the removable hard drive is removed from enclosure 66 via door 70, it is taken to monitoring station 68 or a similar such station. If a review of the images on the transported removable hard drive is necessary, the removable hard drive may be placed in removable hard drive bay 98 within computer 80. Image transfer/verification program 97 then provides monitoring station operator 99 with complete and random access to transferred images 116 stored by the removable hard drive. Hence, if it is suspected that, for example, an act of vandalism is evidenced by a captured image and if that act is suspected to have occurred at a particular time, station operator 99 can immediately begin reviewing an image captured at that time. Operator 99 can move about at will among the captured images. This feature advantageously avoids the time consuming task of reviewing a large amount of serially recorded analog video information such as would be recorded on a video tape. Additionally, images recorded during normal interval image capture mode are easily correlated with alarm related images. If immediate review of the images present on a particular removable hard drive is not required, the drive can be archived for later reference.

Figure 3A:
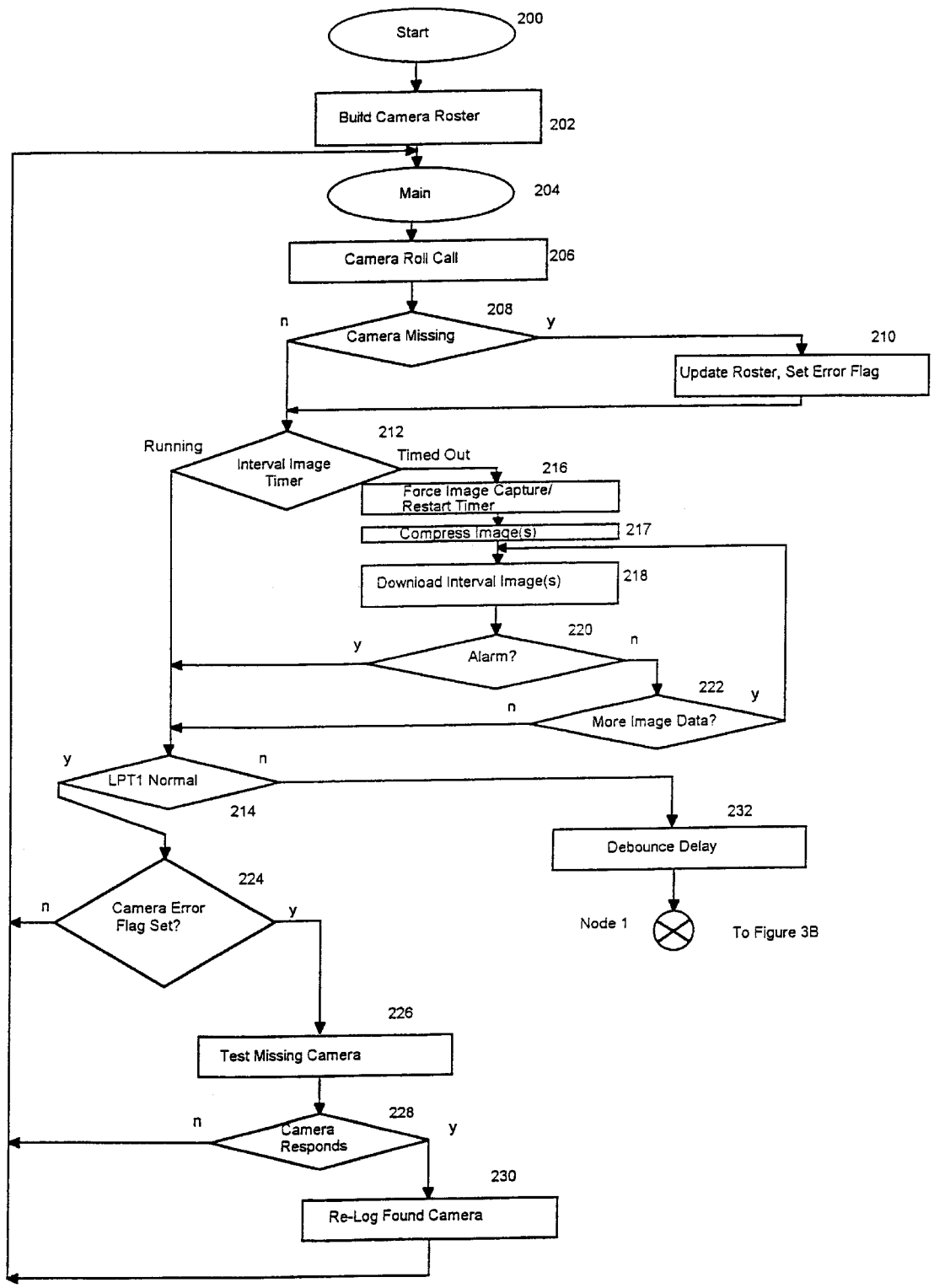
FIG. 3A is a first portion of a flow chart describing and showing the system of the present invention.

With reference now to the flow chart of FIG. 3A in conjunction with FIGS. 1 and 2, a discussion of system operation in accordance with the features of the present invention will now be provided, beginning with Start step 200. During startup, various system initiation procedures are performed such as, for example, setting global variables and loading interrupt routines. Such procedures are well known to those in possession of ordinary skill in the art and, therefore, will not be discussed in further detail. Additionally, LPT1 is read and stored as an "LPT1 normal data value" for use in comparison with subsequent values which are read at predetermined times from LPT1 during the operation of the system. At step 202, an initial roster of operational cameras is built by interrogating the previously described possible range of camera addresses via COM2 of personal computer 104. Each camera which responds upon interrogation is added to the roster. Like the LPT1 normal value, the initial roster is maintained for use in later determinations as to camera status. In step 204, the main program loop is entered. Step 206 follows immediately in which a camera roll call is performed. Each responding camera on the previously built initial camera roster is polled using its respective address. Step 208 then checks the roll call whereby to determine if any cameras are missing. If a particular camera does not respond to the polling inquiry, it is removed from the active roster in step 210 and an error flag is set indicating that the camera is missing from the active roster. In the event that no cameras are found to be missing in step 208, the interval image record mode is entered at step 212 without changing the current camera roster. In step 212, an interval image timer is monitored. Typically, this timer is implemented in software in a manner which is well known in the art and may form part of software control program 112. If the interval image timer is running, the system proceeds to step 214 which will be described below. However, if the timer has timed out, the system goes to step 216. At this latter step, command packets including the address of each respective camera are sent out via COM2 of personal computer 104 whereby to cause a software initiated forced capture of one or more interval images by each camera. Thereafter, the interval image timer is reset and step 217 becomes operative. During step 217, the captured interval images are compressed by image processing/ temporary storage sections 101 of the cameras and temporarily stored, as described previously.

At step 218, the interval images captured responsive to software control are downloaded onto main hard drive 106 from image capture section 100 of each camera. During downloading of the interval images, however, the system remains apprised of camera status by looping through steps 220, 222 and then back to step 218. If no input originated interrupts occur, this loop simply executes until such time that all of the interval images are transferred to main hard drive 106. However, in the event that the cameras receive a force alarm images signal on image trigger line, the cameras are configured so as to immediately abort the transfer of interval images to the main hard drive. Affected cameras then send an abort code to COM2 of personal computer 104 via RS-485/RS-232 converter 103 whereby to indicate that the interval image transfer has been terminated. Step 220 monitors for this code and, responsive thereto, routes system operation to step 214. Personal computer 104 may perform other operations once an abort code has received such as, for example, deleting any aborted, incomplete interval images from hard drive 106.

At step 214, the system reads the current state of parallel port LPT1 of personal computer 104 and compares the current value with the LPT1 normal value which was read at startup time. If the two values do not differ or, in other words, the current value remains normal, the system enters step 224 in which the camera error flags set in step 210 are checked. If the camera error flags are not set, the system returns to the main program loop at step 204. If, on the other hand, an error flag is set, step 226 is entered and each camera is tested for which an error flag is set. No response from the missing camera returns operation to the main program loop, leaving the current camera roster unchanged. If the missing camera or cameras respond, the current camera roster is updated by adding the found camera(s) back to the roster. Operation then resumes at step 204 of the main program loop. The use of the camera roster is advantageous in at least one aspect in that the system avoids sending a command to a non-functional camera which can potentially lock up the system in an infinite loop. In this way, the susceptibility of system operation to problems such as, for example, a cable or camera damaged by vandalism is significantly reduced.

Figure 3B:
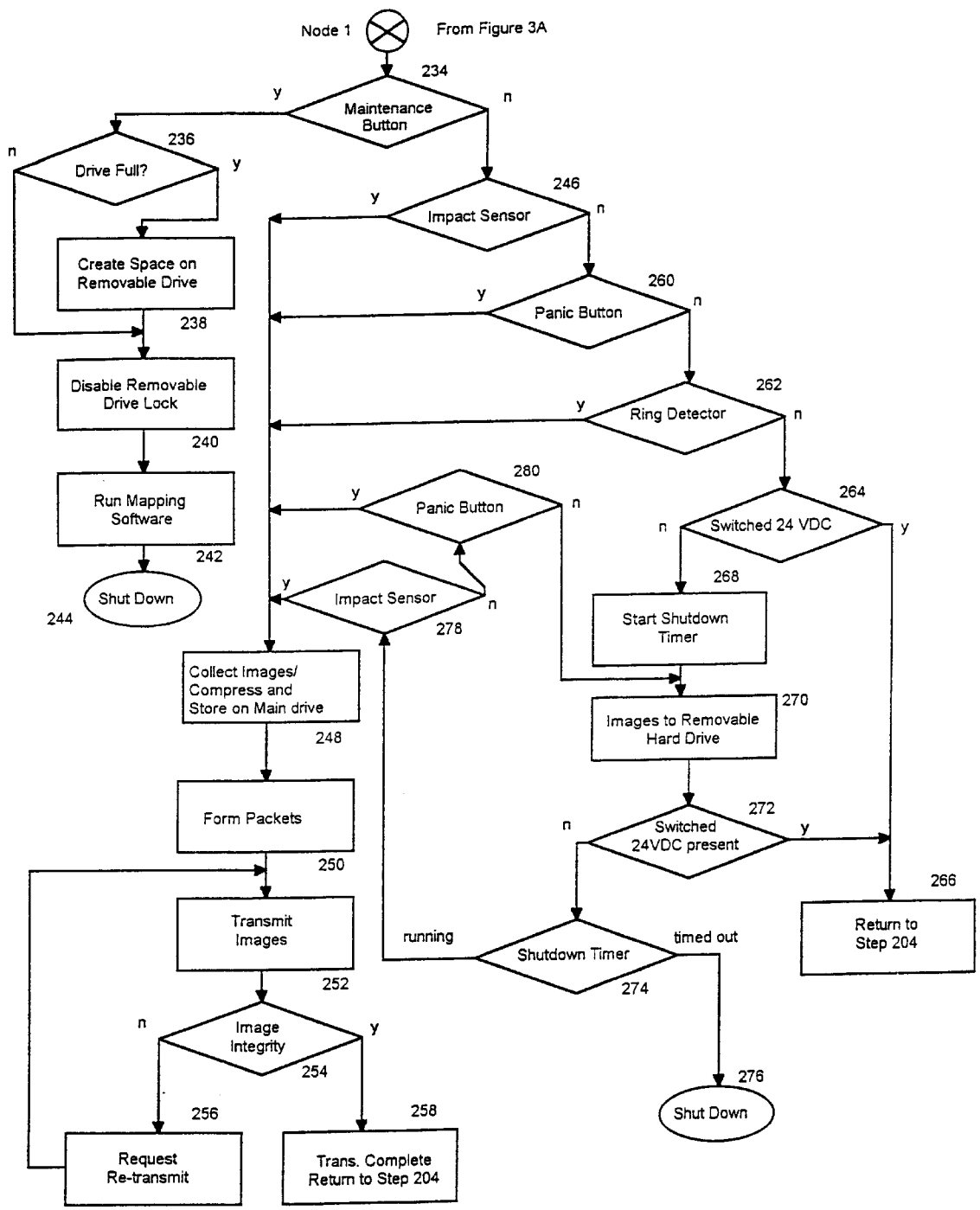
FIG. 3B is a second portion of a flow chart describing and showing the system of the present invention.

With reference now to FIG. 3B in conjunction with FIGS. 1, 2 and 3A, and continuing from step 214, system 50 processes inputs by comparing a current value of the state of LPT1 of personal computer 104 with the normal value determined at startup time. If the values are different, that is, the status of LPT1 is not normal, an input has occurred and operation proceeds to debounce step 232. In a manner which is well known in the art, debounce step 232 introduces a delay which allows any actuated switch or sensor being used as an input to settle to its closed position after being actuated. Thereafter, step 234 monitors maintenance button 148. If the maintenance button is read as actuated following the debounce delay, the system moves to step 236. Steps 236, 238, 240 and 242 comprise the previously mentioned maintenance mode in which notebook PC 76 may be used or, alternatively, the removable hard drive may be removed from component enclosure 66 for transport to the remote location. Connection of the notebook PC is accomplished by simply unplugging cable 121 from LPT1 and connecting the cable from the notebook PC to LPT1. In step 236, a determination is made as to whether removable hard drive 108 is full. If the removable hard drive is full, step 238 creates space on the drive by erasing a predetermined number of the oldest available image files stored on the drive whereby to facilitate subsequent operations. Step 240 disables the lock on the drive such that it can be removed from component enclosure 66, if so desired, for transport to the remote location. At step 242, mapping software is launched which provides access to data stored in system 50 onboard bus 52 through the use of notebook PC 76. Since such mapping software is well known in the art and, for example, is included with version 6.0 of MS DOS by MicroSoft®, a detailed discussion of its operation will not be provided herein. Generally, the mapping software maps personal computer 104, along with all other storage devices coupled thereto, as a hard drive whereby to provide access to all of the data stored in either the removable or main hard drives from notebook PC 76. This functionality is advantageous in cases where the capacity of the drives differs. For example, a particular image may be stored on main hard drive 106 but not on removable hard drive 108. By accessing the system using notebook PC 76, this particular image or, for that matter, any group of images may be randomly accessed and retrieved from the main hard drive. Following completion of tasks performed in the maintenance mode the system shuts down at step 244.

Continuing with a discussion of the remaining system inputs, it is first noted that these inputs all lead to the transmission of alarm images. Step 246 monitors impact sensor 146. If the impact sensor produces a signal responsive to, for example, a collision with another vehicle, step 248 is entered. One or more alarm images are then captured by the image capture section 100 of each camera. Then image processing/temporary image storage section 101 of the respective cameras compresses the image, as described previously and then temporarily stores the image in compressed form. The compressed alarm images are transferred by personal computer 104 via RS-485/RS-232 converter 103 to main hard drive 106 for storage therein as an alarm image group 150 including the date and time at which the image was captured along with identification of the camera. The system may also be configured to bundle one or more pre-alarm images, if available, from image group 114 into alarm image group 150. Pre-alarm images are easily identifiable using the date and time information which is stored as part of each image. In this way, the system advantageously provides the capability of viewing the pre-alarm conditions of the monitored zones along with views captured at the time of the alarm. This latter capability is highly advantageous in instances such as accidents. For example, a pre-alarm image captured by forward looking camera 61a may serve to establish that the operator of bus 52 was not at fault in a particular accident.

Thereafter, at step 250 personal computer 104 processes the alarm image data group 150 for wireless transmission using a special packet protocol. The latter breaks each image down into a series of data packets each of which includes a packet series number and an identification number unique to bus 52 bus or any other such mobile platform from which the images are being transmitted. Each packet also includes a check sum for insuring the integrity of the packet itself.

Once the images are prepared for wireless transmission, as described above, the system enters step 252 wherein personnel computer 104 dials up a predetermined phone number corresponding to phone line 84 at monitoring station 68. Following the establishment of synchronization of modem 82 at the monitoring station with modem 132 on board bus 52, the images which make up alarm image group 150 are sequentially transferred in packet form to computer 80 at the monitoring location via cellular telephone transceiver 144 and the other depicted intervening hardware. During transmission, step 254 checks the integrity of the transferred alarm images at remote monitoring station 68 to verify whether the packets and, therefore, the images have been completely and accurately transmitted. Integrity of each packet is verified using the check sum contained therein while overall image integrity is verified using the aforementioned packet series number and the bus identification number contained by each packet. As the integrity of the transmitted images is confirmed, the system simply proceeds with the transmission of image data. If, on the other hand, certain packets are completely missing and/or corrupted, the system enters step 256, interrupting image transfer with a request for re-transmission of a particular packet or image. The transmission/verification process continues until such time that all the packets are accurately and completely received at monitoring station 68. Once receipt of the alarm image group is verified, step 258 makes the images available for viewing on display 77 and, normally, also generates an alert such as, for example, an audio tone so that monitoring station personnel are aware that alarm images are available for viewing. The alarm images are then viewed and an appropriate response is formulated by monitoring station personnel.

It should be appreciated that the image transmission configuration of the system of the present invention is highly advantageous for a particular reason. That is, since a mobile platform is prone to enter areas such as, for example, tunnels in which communication via cellular transceiver 144 is not possible, the system is configured to simply reestablish communication and resume transmission where integrity was last verified. Furthermore, if the cellular signal is too weak for reliable communication, the system is configured to stop transmitting, reestablish communication once the signal strength has improved and, then, resume transmission of image data.

Still referring to FIGS. 1, 2, 3A and 3B, system operation details with regard to the remaining input signals which interface module 120 receives will now be described. Panic alarm button 73 is monitored at step 260. If a panic alarm is initiated by the operator of the bus, the system moves to previously described step 248. Operation, resulting in the transfer of alarm image group 150 then proceeds per the previously described steps which are subsequent to step 248. Using the panic alarm button, the operator of bus 52 is able to advantageously notify monitoring station 68, in a way which is covert and silent, of a situation which demands immediate attention such as, for example, an unruly passenger or that the bus is being hijacked.

If a panic signal is not detected, ring detector 142 is monitored by step 262. Responsive to monitoring station operator 96 dialing the cellular telephone number assigned to transceiver 144 on bus 52 and then hanging up after ringing one or more times, ring detector 142 will detect the standard cellular telephone ring signal generated by the transceiver. Upon detection by ring detector 142, system operation moves to step 248 and proceeds therefrom by transferring images to monitoring station 68 per the subsequent steps. This latter feature is highly advantageous in providing the capability at monitoring station 68 to remotely obtain real-time visual information as to the state of bus 52 at any desired time. It should be appreciated that any number of aspects of operation of the bus of the present example or any other mobile platform may be confirmed using this feature.

One of ordinary skill in the art will appreciate the significance of the mobile, ground-based platform monitoring system of the present invention with regard to its ability to provide information to the remote monitoring location. Images provided to the remote location can be used to determine specifically which emergency services should respond. For example, if a passenger is having a heart attack while lying in the aisle of the bus as the panic alarm button is depressed, the images presented at the remote monitoring location would dictate the immediate need for an ambulance. Monitoring may then continue from the remote location by simply dialing cellular transceiver 144 and then hanging up whereby still further images will be transmitted.

It should be appreciated that invaluable information can be provided by the system of the present invention in an unlimited number of situations. Additionally, the configuration of the system is easily modified to accommodate virtually any type of input signal for triggering alarm image transmission.

In step 264, +24 VDC switched line 128 is monitored for voltage. If voltage is present on line 128, step 266 returns the system to its main loop at step 204. However, in the absence of voltage on line 128, which is typically due to the bus being turned off, step 268 activates a shutdown timer by setting it to a predetermined interval. The predetermined interval may be set to virtually any desired time. It is also noted that the battery of the bus should be capable of satisfying power requirements of the system for the desired interval. Typically, the interval to which the shut down timer is set will be one hour. However, other intervals may be found to be useful dependent upon a particular application. In step 270 following shutdown timer activation, image data group 114 (which may consist of alarm as well as interval images) present on main hard drive 106 is transferred to removable hard drive 108 whereby to comprise transferred image data group 116. Step 272 continues monitoring the voltage on switched +24 VDC line 128. If voltage is present on the line, system operation moves, via step 266, back to normal operation at step 204. On the other hand, if voltage is absent on line 128, step 274 is entered and monitors the previously mentioned shutdown timer which may be implemented, for example, in a well known way within software control program 112. If the shutdown timer times out after the predetermined interval to which it is set, the system shuts down at step 276. During operation of the shutdown timer, however, the system continuously loops through steps 278 and 280 in which the panic button and the impact sensor are monitored, respectively. If either of these inputs is actuated, operation immediately proceeds to step 248 and its subsequent steps, ultimately resulting in the transmission of alarm images. This feature is advantageous in that the panic alarm is available to the bus operator even if the bus is turned off, for example, due to engine failure. Continued monitoring of the impact sensor is useful, for example, if the bus is hit by another vehicle while parked and the incident goes unobserved by the operator. It is also mentioned that the system loops through step 270, in which image transfer from the main hard drive to the removable hard drive is accomplished. One skilled in the art should appreciate that step 270 may be replaced by a decision step (not shown) which checks to see whether image transfer is complete prior to shut down. This feature is useful in cases where it may be desired to set the shutdown timer to intervals which are significantly shorter than one hour. Additionally, the system is configured such that, if the bus is restarted prior to shutdown of the system, image transfer to the removable hard drive ceases. Upon reactivation of the shutdown timer, image transfer resumes at the point where it left off when the bus was restarted. This feature is readily provided, for example, by using the archive attribute provided for files in MS DOS. Since each image is typically stored as a file, the system may set the archive bit for each file as it is transferred. Thus, notebook PC 76, when running in the maintenance mode, may identify files which are only resident on the main hard drive by checking for archive bits which are not set. Furthermore, once the removable hard drive is full, the oldest images present thereon are overwritten with new images, as previously described. In such cases, when a file is overwritten, the system removes the archive bit from the parent file resident on the main hard drive.

As mentioned previously, the system of the present invention may be adapted for use with existing systems. In such adaptations, the features of the present invention are highly advantageous. For example, one previously described prior art system employs an onboard GPS receiver. The GPS coordinates of a bus or other such vehicle are transmitted to a central station by this prior art system. Typically, this prior art system is tested for proper operation by requiring the operator to actuate the panic alarm upon placing the bus into service. When used with this particular prior art system, the system of the present invention may be configured to ignore the first alarm signal following startup of the system whereby to avoid the unnecessary transmission of alarm images responsive to the test. At the same time, however, great care must be taken in avoiding a situation in which a bona fide panic alarm is ignored simply because the system restarted after the bus has been turned off during a break. The shutdown timer feature, described immediately above, is instrumental in avoiding such a situation. With the shutdown timer interval properly set, the system of the present invention will only startup upon initial placement of the bus or other such mobile platform into service. Therefore, only one panic alarm is ignored from startup until shutdown, regardless of the number of times the bus is turned off, provided only that the shutdown timer interval is not exceeded.

It should be understood that a system for monitoring a mobile, ground-based platform may be embodied in many other specific forms and modified in an unlimited number of ways without departing from the spirit or scope of the present invention. For example, the transfer of captured images from cameras 61 to main hard drive 106 and to removable hard drive 108 may be performed in many other ways. In the embodiment described above, images are transferred to the removable hard drive from the main hard drive only when the bus is stationary. However, in another embodiment, it may be preferable to transfer images directly to a removable media from the cameras without intermediate storage in a main hard drive. Moreover, many other forms of storage media may be found to be useful with the present invention including, for example, properly configured RAM modules. Such media may, for example, be immune to jarring caused by movement of the mobile platform while it is in operation. In still another embodiment, images may be stored in RAM without the need for a hard drive or such similar media. Therefore, the present examples are to be considered as illustrative and not restrictive, and the invention is not to be limited to the details given herein, but may be modified within the scope of the appended claims.

What is claimed is:

1. A security system for use on a mobile, ground-based platform, said system comprising:

at least one camera attached to said mobile, ground-based platform and positioned for capturing images of a predetermined portion of the platform;

image storage means attached to the mobile, ground-based platform for digitally storing said images on the mobile, ground-based platform, said image storage means being configured to digitally store said images in a way which provides for random access to the images; and transfer means for responding to at least one input signal, wherein upon receipt of said input signal the transfer means cooperates with said image storage means to automatically select one or more images acquired prior to the generation of said input signal and to initiate the wireless transmission of said one or more selected images to at least one location remote from said mobile, ground-based platform so that the selected images are viewable at the remote location.

2. The security system of claim 1, wherein:

said image transfer means includes means for verifying accurate and complete transfer of said images between the mobile, ground-based and the remote location.

3. The security system of claim 2, wherein:

said transceiver means includes a cellular telephone transceiver.

4. The security system of claim 1, wherein:

said camera is a digital camera having a housing, and wherein said temporary storage means is positioned within said housing.

5. The security system of claim 1, further comprising:

control means for selectively controlling the capture and storage of images by said camera and image storage means, wherein said image storing means stores captured images at predetermined intervals, said control means also being responsive to said input signal such that, upon receipt of the input signal, storage of images at said predetermined intervals is suspended until one or more said selected images are transferred.

6. The security system of claim 1, wherein:

said mobile, ground-based platform is operated by an operator and wherein said system includes panic signal means which produces said input signal as a panic signal initiated by said operator via the panic signal means.

7. The security system of claim 6, wherein:

said system receives a shutdown signal from said mobile, ground-based platform while the platform is stationary and wherein said panic signal means is configured so as to continue to respond to said panic signal for a predetermined period of time following the initial receipt of the shutdown signal such that said alarm image is transferred during said predetermined time period.

8. The security system of claim 7, wherein:

said predetermined time period is at least one hour.

9. The security system of claim 1, wherein:

said transfer means includes transmission verification means for verifying accurate and complete transmission of the selected images between the mobile, ground-based and the remote location.

10. The security system of claim 9, wherein:

said transfer means includes means for causing said transceiver means to re-transmit certain portions of said selected images which are identified by said transmission verification means as inaccurate or incompletely transmitted.

11. The security system of claim 9, wherein:

said transmission verification means includes means for dividing said images into a series of packets, each packet including means for identifying the specific original image from which it was produced and the specific mobile, ground-based platform from which the image was transferred.

12. The security system of claim 11, wherein:

said transfer verification means includes means for generating a check sum which forms part of each said packet and wherein said means for detecting missing or inaccurate packets determines the accuracy of each transferred packet using said check sum.

13. The security system of claim 11, wherein:

said packet identification means specifies a packet identification number and an image identification number, which is unique to said mobile, ground-based platform, for each packet.

14. The security system of claim 11, wherein:

said transfer means includes means positioned at said remote location for reassembling said images by using said packet identifying means.

15. The security system of claim 14, wherein:

said reassembling means includes means for detecting missing or inaccurately transmitted packets and for causing said transfer means to re-transmit the missing or inaccurate packets until they are completely and accurately transferred to the remote location.

16. The security system of claim 1, wherein:

said system includes impact detection means on the mobile ground-based platform for producing said input signal responsive to an impact sustained by the mobile, ground-based platform.

17. The security system of claim 16, wherein:

said system receives a shutdown signal from said mobile, ground-based while the platform is stationary and wherein said impact detection means remains responsive to impacts for a predetermined period of time following the initial receipt of the shutdown signal so that said alarm image is transferred during said predetermined time period.

18. A security system for use on a mobile, ground-based platform, said system comprising:

at least one camera attached to said mobile, ground-based platform and positioned for capturing images of a predetermined portion of the platform;

image storage means attached to the mobile, ground-based platform for digitally storing said images on the mobile, ground-based platform, said image storage means being configured to digitally store said images in a way which provides for random access to the images;

transfer means for responding to at least one input signal, wherein upon receipt of said input signal the transfer means cooperates with said image storage means to automatically select one or more images acquired prior to the generation of said input signal and to initiate the wireless transmission of said one or more selected images to at least one location remote from said mobile, ground-based platform so that the selected images are viewable at the remote location; and transmission verification means for verifying accurate and complete transmission of the selected images between the mobile, ground-based platform and the remote location and for causing said transfer means to re-transmit only certain portions of said selected images which are identified by said transmission verification means as inaccurate or incompletely transmitted.

* * * * *